Oct. 29, 1940.                W. JONES                2,219,815
REFRIGERATING AND HEATING SYSTEM
Filed Jan. 18, 1939
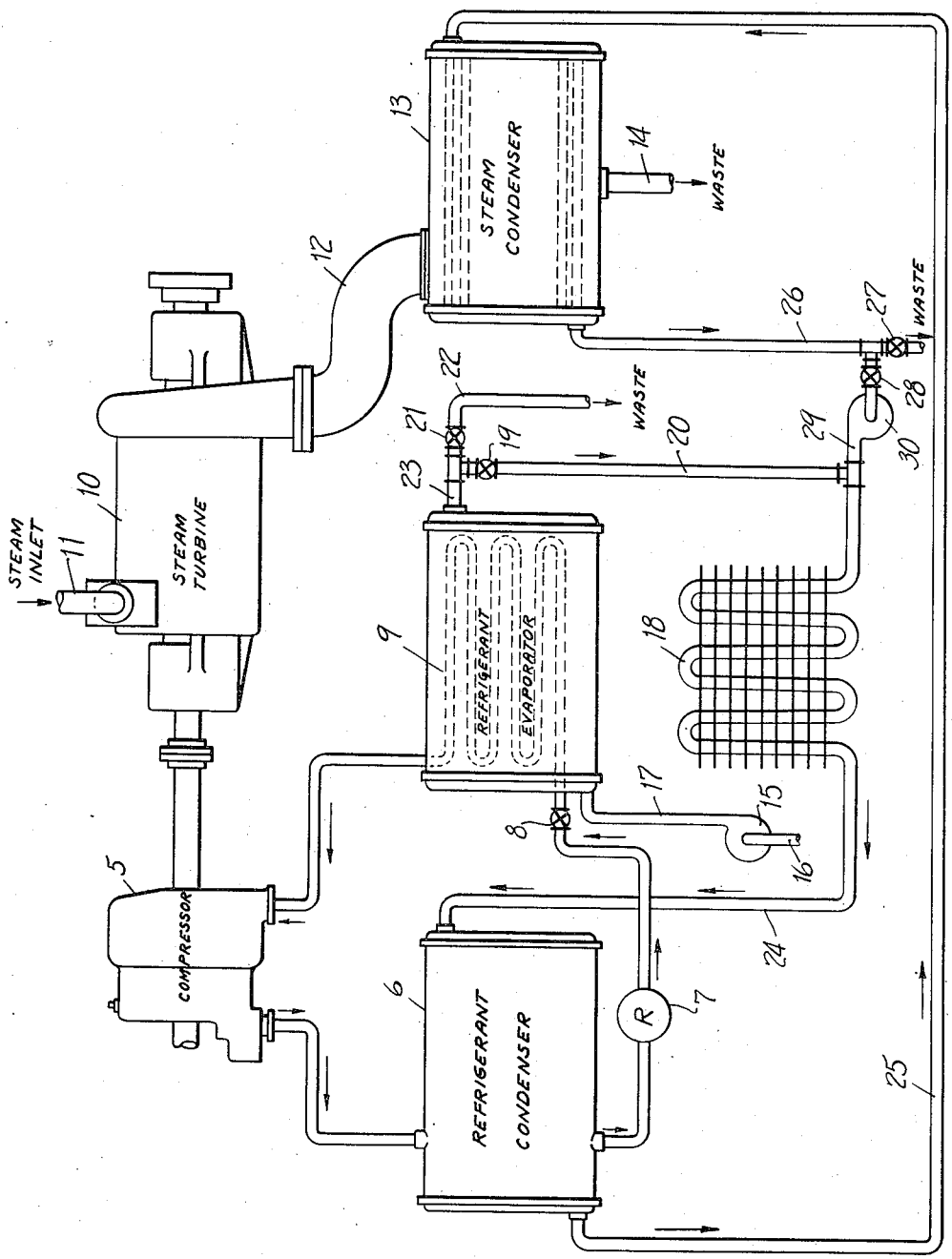
INVENTOR
WALTER JONES
BY
ATTORNEY Patented Oct. 29, 1940

2,219,815

UNITED STATES PATENT OFFICE 2,219,815

REFRIGERATING AND HEATING SYSTEM

Walter Jones, Syracuse, N. Y., assignor to Carrier Corporation, Syracuse, N. Y., a corporation of Delaware Application January 18, 1939, Serial No. 251,469

8 Claims. (Cl. 257—9)

This invention relates to air conditioning and more particularly to the application of a mechanical refrigerating cycle to both cooling and heating.

The general object of the invention is to provide an improved method of and means for regulating temperatures by utilization of the mechanical refrigerating cycle in such manner as to effect either heating or cooling, as desired.

Another object of the invention is to provide an improved power-driven heat transfer system for both heating and cooling which may readily be adjusted to provide cooling instead of heating, and vice versa, the change-over of the function of the system being effected without affecting substantially the operation of the various elements comprising the system.

It is another object of the invention to provide a heat exchange system adapted for both heating and cooling, employing a refrigerating system including a compressor driven by a steam turbine or the like, which system results in substantial operating economies. In heating, practically all of the heat in the steam supplied to the turbine remains available for heating, as it would be if used conventionally in a steam radiator or the like. Additionally, this steam is used to pump heat from an additional source, through the refrigerating system, so that this additional pumped heat augments the heat available in the steam supplied. Thus, for a given amount of heat in the steam supplied to the system, a greater total heating effect is produced. In cooling, economical operation is assured by drawing relatively cool water from a suitable source such as a deep well, and using this water, after it has been further cooled, to produce the desired cooling effect. Because of the initial low temperature of this water, it need be cooled through only a relatively small differential, and this may be accomplished with relatively little expenditure of energy. After it has performed its cooling function, the water is used for condensing purposes, further to increase the effectiveness of the system.

It is another object of the invention to provide a refrigerating system capable of providing either heating or cooling effects, as desired, which is relatively simple and which comprises but relatively few parts, which in themselves may be conventional.

It is another object of the invention to provide a heat transfer system capable of both heating and cooling which is efficient and reliable in operation, and which, because of its simplicity and utilization of various conventional parts, may readily be repaired in the event of mishap.

According to the invention, a refrigerant evaporator, compressor, and condenser are connected together in conventional refrigerant flow relationship. Also provided are a steam turbine for driving the compressor, a steam condenser, and a heat exchange device adapted either to be heated or cooled by the system to provide heating or cooling effect, as desired.

Under summer operating conditions, when cooling is to be effected, a suitable medium such as water drawn from a well or city main is circulated through the refrigerant evaporator, whereby it is cooled to the desired degree. It is then delivered to the heat exchange device, where it exerts a cooling effect on a second medium such as air or water to be cooled. The circulated medium is then routed through the refrigerant condenser and the steam condenser, to condense refrigerant and steam respectively, and is then wasted or otherwise suitably disposed of.

Under winter operating conditions, when heating is desired, the water circulated through the refrigerant evaporator is wasted after being cooled. Other water is circulated in a continuous closed cycle throught the refrigerant condenser, operating at a relatively high temperature, then through the steam condenser, operating at a still higher temperature, and is then delivered to the heat exchange device, where its high temperature is utilized to provide the desired heating effect. The water is then returned to the refrigerant condenser and the cycle repeated.

Since the operation of the refrigerant evaporator, compressor and condenser, and the steam turbine and condenser, are the same whether heating or cooling is being provided, and since the change in function of the system results solely from a change in the routing of circulated medium, desired change-over may be effected simply and conveniently, merely by the manipulation of a few water valves and switch mechanism controlling the circulation of the water.

Other objects, features and advantages of the invention will be more apparent from the following description, to be read in connection with the accompanying drawing which illustrates diagrammatically an apparatus embodying the invention in a preferred form.

Referring now to the drawing, the numeral 5 designates the compressor of a mechanical refrigerating apparatus including a condenser 6, receiver 7, expansion valve 8 and evaporator 9. These elements may be of any desired type, but preferably, the condenser and evaporator are of shell and tube construction; and preferably, the compressor is of the centrifugal type.

A steam turbine or the like, 10, drives the compressor 5, and is supplied with steam or similar motivating fluid from any suitable source through inlet connection 11. Steam which has expanded within the turbine is delivered therefrom through exhaust connection 12 to steam condenser 13, which may be of any desired construction, but preferably is of the shell and tube type. Steam condensate is drained from the condenser 13 through connection 14 for disposal in any desired manner.

A pump 15 draws water or the like from any suitable source (not shown) such as a well or city main, through pipe 16, and delivers this water through pipe 17 to the refrigerant evaporator 9, where the water is cooled by evaporation of refrigerant. Under summer operating conditions, when cooling is desired, this cooled water is routed from the evaporator to heat exchange device 18 of any desired type. As shown, the device 18 comprises a length of coil provided with extended surface in the form of plate fins, but it is to be understood that the invention contemplates the utilization of any desired type of heat exchange device, for cooling either gaseous or liquid mediums, and is not restricted to the illustrative form shown in the drawing. In general, device 18 is suitably housed and air from the space to be conditioned, or other fluid to be treated, is routed through the housing in heat exchange relationship with the surfaces of device 18. When cooled water from the evaporator is routed to the heat exchange device 18, the valve 19 in line 20 is opened, so that the water may flow therethrough to the heat exchange device. The valve 21, in the pipe 22, also leading from the cold water outlet 23 of the evaporator, is closed at this time.

The water passing from heat exchange device 18 is then delivered through pipe 24 to the refrigerant condenser 6, where it serves to condense refrigerant evaporated in evaporator 9. The water is then routed through pipe 25 to the steam condenser 13, where it condenses steam delivered from turbine 10. The circulated water is then passed from the system through pipe 26, the valve 27 therein being opened. During such operation, the valve 28, in pipe 29 connecting pipes 26 and 20, is closed, and pump 30, interposed in line 29, is inoperative.

The temperature of the circulated water leaving the evaporator is relatively low, and increases as the water is circulated successively through the heat exchange device 18, refrigerant condenser 6 and steam condenser 13. Thus, by way of illustration, the water leaving the evaporator may be at a temperature of approximately 51°, at the outlet of the heat exchange device it may be approximately 63°, at the outlet of the refrigerant condenser 6 it may be approximately 70°, and at the outlet of the steam condenser 13, it may be approximately 85°. At all stages, this water is utilized efficiently to effect the desired heat transfer.

When it is desired to use the apparatus for heating, rather than for cooling, valves 21 and 28 are opened, valves 19 and 27 are closed, and pump 30 is rendered operative. Otherwise, the system operates as above described. In such case it will be seen that the water cooled by the evaporator is discharged from the system through pipe 22; and water is circulated in a closed and continuous cycle, by the pump 30, through the refrigerant condenser 6, then through the steam condenser, then through the heat exchange device, and then through all these elements in a repetition of the cycle. By way of illustration, the temperature of the water leaving the refrigerant condenser 6 may be approximately 98°, approximately 115° when it leaves the steam condenser 13 for supply to the heat exchange device 18, and approximately 90° when it is returned to the refrigerant condenser from the heat exchange device 18.

If desired, a single three-way valve may be substituted for the valves 19 and 21, and the valves 27 and 28 may similarly be replaced by a single three-way valve, thus further to simplify the apparatus. Thus, merely by changing the position of a few valves, and turning the pump 30 on or off, as required, the system may be changed over from heating to cooling or vice versa. If desired, of course, this control may be effected automatically by the use of expedients well known in the art.

It will thus be seen that there has been provided a system which, in heating, economically and efficiently affords a dual supply of heat. While the steam is used for pumping heat, through the refrigerating system, all of the energy expended for this purpose is recovered in the refrigerant condenser, except for negligible losses, due to friction, etc. Thus, there is available for heating all of the heat originally available in the steam supplied to the system. Additionally, its use as described above, serves to make available other heat pumped by the refrigerating system. It has been found that the supply of this additional heat more than offsets the operating costs of the system, so that substantial net savings may be realized.

Whether the apparatus is used for heating or for cooling purposes, its operation is highly efficient and affords substantial savings in operating costs as compared with systems heretofore known.

Since certain changes in carrying out the above method of operation and in the constructions set forth, which embody the invention, may be made without departing from its scope, it is intended that all matter contained in the above dscription or shown in the accompanying drawing shall be interpreted as illustrative and not in a limiting sense.

I claim:

1. In a heating and cooling apparatus of the character described, a refrigerant evaporator, a refrigerant condenser, a compressor, said evaporator, condenser and compressor being arranged to provide a refrigeration cycle, a steam operated heat engine for driving said compressor, a condenser adapted to receive steam discharged from said heat engine, a heat exchange device, and water circulating means, said last mentioned means being arranged to circulate water through said evporator, then through said device and then through said refrigerant condenser and steam condenser in series, means for eliminating said evaporator from said water circulation circuit, said last mentioned means being inoperative under summer operating conditions when it is desired to cool air passing in contact with said device and operative when it is desired to heat air passing in contact with said device.

2. In a heating and cooling apparatus of the character described, a refrigerant evaporator, a refrigerant condenser, a refrigerant compressor, said evaporator, condenser and compressor being arranged to provide a refrigeration cycle, a steam operated heat engine driving said compressor, a condenser adapted to receive steam discharged from said heat engine, a heat exchange device, means for circulating water successively through said evaporator, said device, and said condensers in series, under summer operating conditions and means for eliminating the evaporator from said circulation of water whereupon water will circulate in a closed circuit through said device and said condensers in series, and other water will be routed through the evaporator, said last mentioned means being inoperative under summer operating conditions.

3. In a heating and cooling apparatus of the character described, a refrigerant evaporator and means for circulating water therethrough; a refrigerant condenser; a refrigerant compressor, said evaporator, condenser and compressor being arranged to provide a refrigeration cycle; a steam operated heat engine driving said compressor; a condenser adapted to receive steam discharged from said heat engine; a heat exchange device; means operative under winter operating conditions for circulating water in a closed circuit successively through said device and said refrigerant and steam condensers in series, and means for converting said circuit to an open circuit including said refrigerant evaporator, said last mentioned means being inoperative under winter operating conditions.

4. In a cooling apparatus of the character described, a refrigerant evaporator; a refrigerant condenser; a refrigerant compressor, said evaporator, condenser and compressor being arranged to provide a refrigeration cycle; a steam operated heat engine driving said compressor; a condenser adapted to receive steam discharged from said heat engine; a heat exchange device; means for circulating water successively through said evaporator, said device, and then through said condensers in series under summer operating conditions and means for circulating water in a circuit which bypasses said evaporator, said last mentioned means being inoperative under summer operating conditions.

5. In a heating and cooling apparatus of the character described, including a refrigerant evaporator, a refrigerant compressor, a refrigerant condenser, said evaporator, condenser and compressor being arranged to provide a refrigeration cycle, a steam operated heat engine driving said compressor, and a second condenser connected to said heat engine, the combination of a heat exchange device, means for passing a medium in heat exchange relation with said evaporator, means operative under summer operating conditions for then circulating said cooled medium in heat exchange relation with said device and then through said refrigerant condenser and thereafter through said second condenser, said condensers and device being included in an open circuit from which the medium is discharged and means for including said condensers and device in a closed circuit, said last mentioned means being inoperative under summer operating conditions.

6. In a heating and cooling apparatus of the character described, including a refrigerant evaporator, a refrigerant compressor, a refrigerant condenser, said evaporator, condenser and compressor being arranged to provide a refrigeration cycle, a steam operated heat engine driving said compressor, and a second condenser connected to said heat engine, the combination of a heat exchange device, means for passing a medium in heat exchange relation with said evaporator, means operative under winter operating conditions for circulating second heat exchange medium in a closed continuous cycle in heat exchange relation through said device, then through said refrigerant condenser and thereafter through said steam condenser and means for converting said closed cycle to an open cycle wherein only said first mentioned medium is used in a course including said evaporator, device and both condensers, said last mentioned means being inoperative under winter operating conditions.

7. In a heating and cooling apparatus of the character described, including a refrigerant evaporator, a refrigerant compressor, a refrigerant condenser, said evaporator, condenser and compressor being arranged to provide a refrigeration cycle, a steam operated heat engine driving said compressor and a second condenser connected to said heat engine, the combination of a heat exchange device, means for passing a medium in heat exchange relation with said evaporator, a first connection for discharging from the apparatus medium delivered from said evaporator, a second connection providing communication between said evaporator and said device, means for rendering said first and second connections selectively operative, means for delivering medium from said device to said condensers, a third connection for discharging from the apparatus medium delivered from said condensers, a fourth connection for delivering to said device medium delivered from said condensers, and means for rendering said third and fourth connections selectively operative, whereby said device may be utilized for cooling by rendering operative said second and third connections.

8. An apparatus according to claim 7 including a pump adapted to circulate medium through said device and said condensers when said first and fourth connections are rendered operative whereby said device may be utilized for heating.

WALTER JONES.